US 11,485,495 B1

(12) United States Patent
Gyurek et al.

(10) Patent No.: US 11,485,495 B1
(45) Date of Patent: Nov. 1, 2022

(54) ELECTRICALLY-POWERED STORES RACK EJECTOR

(71) Applicant: Science Applications International Corporation, Reston, VA (US)

(72) Inventors: John W. Gyurek, Indianapolis, IN (US); Thomas M. Opheim, Indianapolis, IN (US)

(73) Assignee: Science Applications International Corporation, Reston, VA (US)

( * ) Notice: Subject to any disclaimer, the term of this patent is extended or adjusted under 35 U.S.C. 154(b) by 0 days.

(21) Appl. No.: 17/363,924

(22) Filed: Jun. 30, 2021

(51) Int. Cl.
*B64D 1/04* (2006.01)

(52) U.S. Cl.
CPC ..................... *B64D 1/04* (2013.01)

(58) Field of Classification Search
CPC ....................................... B64D 1/04
See application file for complete search history.

(56) References Cited

U.S. PATENT DOCUMENTS

| | | | |
|---|---|---|---|
| 3,295,410 A | 1/1967 | Edwards | |
| 4,727,670 A * | 3/1988 | Krouse | F41A 19/58 42/84 |
| 4,777,556 A * | 10/1988 | Imran | H01H 47/043 361/194 |
| 7,806,683 B2 * | 10/2010 | Mitxelena | F23K 5/16 431/18 |
| 8,127,655 B1 * | 3/2012 | Kay | B64D 1/06 89/1.54 |
| 8,516,938 B2 | 8/2013 | Roemerman et al. | |
| 9,180,967 B2 | 11/2015 | Binkholder et al. | |
| 2006/0108478 A1 * | 5/2006 | Bajuyo | B64D 1/04 244/137.4 |
| 2009/0100996 A1 | 4/2009 | Jakubowski, Jr. et al. | |

* cited by examiner

*Primary Examiner* — Richard G Davis
(74) *Attorney, Agent, or Firm* — Banner & Witcoff, Ltd.

(57) ABSTRACT

An electrically-powered stores rack ejector for aircraft may be configured to carry and release stores (e.g., various munitions, such as missiles and/or bombs, and/or auxiliary fuel tanks). The stores rack ejector may include a housing and an ejector foot movably coupled to the housing, and the ejector foot may be configured to extend from the housing. The housing of the stores rack ejector may also include one or more suspension hooks movably coupled to the housing and the suspension hooks may be configured to release in conjunction with an extension of the ejector foot. One or more solenoids may be coupled to the ejector foot and may be energizable to cause the extension of the ejector foot. The stores rack ejector may also include a controller that may be configured to cause, based upon receiving a command associated with stores release, an energizing of the one or more solenoids.

23 Claims, 10 Drawing Sheets

ELECTRICALLY-POWERED STORES RACK EJECTOR

BACKGROUND

Military aircraft employ bomb carriage and release systems that forcefully push ordnance or other stores away from an aircraft during flight. Sufficient force is required to eject or push a store away from the aircraft so as to avoid laminar and/or turbulent surrounding airflow, and/or to force the store out of a slipstream, at both subsonic and supersonic speeds of combat aircraft. Exiting such problematic airflows prevents the released ordnance or store from colliding back into the aircraft and prevents unintended bomb to bomb collisions.

To achieve the required ordnance ejection force, at least some current systems employ pyrotechnic Cartridge-Activated Devices (CADs) to actuate pistons that push ordnance and stores away from the bomb rack ejector and aircraft. CADs are one-time use pyrotechnic devices that are similar to shotgun shells (albeit without shot or other projectile) and that explode when electrically initiated. The exploding CAD produces very high-pressure pneumatic gases in bomb rack ejectors to actuate hooks and pistons that release and push ordnance or other stores away from the aircraft. CADs, however, require extensive safe handling procedures, proper storage, and proper loading techniques into bomb rack ejectors since CADs are explosives. Further, CADs have a finite shelf life and the use of the explosives requires subsequent maintenance actions to clean carbon residue from the bomb rack ejectors after use. Using CADs requires ongoing safety training for proper handling and results in ongoing logistical costs for storage and maintenance. In addition to the use of CADs, newly designed bomb racks incorporate a pneumatic compressor that pumps up a storage cylinder to replace the use of CADs. When commanded by the aircraft, the bomb racks release the stored pneumatic energy in the cylinder to actuate the pistons and push the ordnance away from the aircraft. Use of such compressors presents reliability, testing, and maintenance issues.

SUMMARY

This Summary introduces a selection of concepts relating to this technology in a simplified form as a prelude to the Detailed Description that follows. This Summary is not intended to identify key or essential features.

An electrically-powered stores ejector (e.g., for a combat aircraft) may include an ejector foot contained within a housing and that is movably coupled to and configured to extend from the housing to exert a force on a store (e.g., a bomb or other ordnance), and/or other carriage equipment, such as a bomb suspension hook, to release the store. Suspension hooks may also be movably coupled to the housing and may simultaneously move to an unlocked or release position upon extension of the ejector foot. The stores ejector may also include one or more solenoids coupled to the ejector foot and energizable to cause the extension of the ejector foot when commanded by a controller to release a weapon or other store. The controller may also be configured to control the energizing of the solenoids. The housing of the stores ejector may also include an electrical energy storage device such as, for example, one or more capacitors or a capacitor bank. An aircraft interface may also be coupled to the housing and may provide commands associated with stores release. The stores ejector may include power conversion circuitry that uses aircraft electrical power, via the interface, to charge the energy storage device. The stores ejector may include solid-state transistor circuitry to connect the energy storage device to the solenoids. The stores ejector may, for example, be configured to carry and release 250-pound to 4000-pound class munitions.

An electrically-powered stores release unit/ejector may include a housing unit that may have a shape corresponding to, and/or may have footprint similar to, one or more existing types of bomb ejector racks. This may allow the electrically-operated stores ejector rack to replace a BRU-32 Series Ejector Unit Rack Assembly, a BRU-33 Series Vertical Ejector Unit Rack Assembly, a BRU-55 Series Aircraft Bomb Ejector Unit Rack, a BRU-75/A or BRU-76/A Bomb Rack Unit, a BRU-41/A Improved Multiple Ejector Rack Unit, a BRU-42/A Improved Triple Ejector Rack Unit, a BRU-59 bomb ejector rack, and/or other conventional ejector racks. The electrically-powered stores ejector may carry air-to-ground munitions such as conventional gravity bombs such as Mk-82 series bombs, cluster munitions, mines, tactical air launched decoys (TALD), practice bombs such as the Mk-76, BDU-33, LGTR (Laser Guided Training Round), or "smart" bombs such as laser guided bombs to include GBU-10, GBU-12, GBU-16, GBU-24, JDAM, JSOW, GBU-39 small diameter bomb (SDB), etc. Munitions and/or other stores may be suspended from the electrically-powered ordnance ejector via standard 14-inch, 20-inch, and 30-inch suspension lugs, allowing it to be deployed upon across a number of different types of combat aircraft.

These and additional features will be appreciated with the benefit of the disclosures discussed in further detail below.

BRIEF DESCRIPTION OF THE DRAWINGS

A more complete understanding of features described herein and advantages thereof may be acquired by referring to the following description in consideration of the accompanying drawings, in which like reference numbers indicate like features.

DETAILED DESCRIPTION

In the following description of the various embodiments, reference is made to the accompanying drawings identified above and which form a part hereof, and in which is shown by way of illustration various embodiments in which features described herein may be practiced. It is to be understood that other embodiments may be utilized and structural and functional modifications may be made without departing from the scope described herein. Various features are capable of other embodiments and of being practiced or being carried out in various different ways.

To reduce costs, improve safety, and improve ordnance release performance and reliability, a weapon or other store may be ejected from an aircraft using an electrically-powered actuator. The actuator may, for example, comprise a linear actuator such as a linear solenoid that is coupled to a rod and/or other mechanism. When energized, the linear actuator may move the rod or other mechanism to push a weapon or other store with sufficient separation energy. Energizing energy for activating a solenoid (or an electromagnetic element of another type of actuator) driving a rod or other mechanism used to eject a store from a combat aircraft may be stored in a capacitive storage device. The control of the energy imparted to the store may be accomplished with processor-controlled transistors that use a stored electrical charge to fire the solenoid. Such a system may replace the explosive CADs used in current systems. The system may be tailored to various ordnance separation profiles and applicable to multiple types of stores and various flight conditions and profiles. Such a system and method of releasing ordnance and stores has many advantages over existing systems in safety, reliability, and adaptability.

An electrically-powered stores release unit/ejector may provide a highly reliable and safe stored energy system for stores release and separation from aircraft. A store may comprise a weapon (e.g., a bomb, missile, mine, etc.) or other component (e.g., fuel tank, cargo container, etc.). The terms ordnance, munitions, and weapons may be used interchangeably. Novel systems and methods described herein may be used to eject a store from an aircraft using an electrical solenoid, staged solenoid, or other actuator to impart sufficient required separation energy to eject a released store and cause that store to separate from an aircraft. The energy required for activating an electromagnetic element of the actuator may be stored in a capacitive storage device(s), capacitor bank, battery, batteries, or other electrical energy storage device. The control of the energy imparted to the store may be accomplished with processor-controlled transistors that use a stored electrical charge to fire the actuator. This system may replace chemical explosive devices such as CADs. With the advent of smaller munitions such as the Small Diameter Bomb II (SDB II), the military has implemented modifications to existing systems to reduce ejection forces on smaller weapons such as using a single CAD instead of two CADs. The electrically-powered stores ejector described herein, however, may be programmable to impart reduced forces on weapons such as SDB II. Further, the systems and methods disclosed herein have many advantages over existing systems in safety, reliability, and adaptability.

An electrically-powered stores ejector may be configured to maintain the size, weight, and functionality of current bomb rack ejector systems. For example, a BRU-32 (series) ejector unit rack assembly is a non-jettisonable, single carriage rack used for carrying weapons or other external stores on various fighter aircraft. The BRU-32A/A is capable of carrying weapons or stores of from about 10 to 28 inches in diameter and weighing up to about 2,600 pounds. The BRU-32B/A is capable of carrying weapons or stores of the same diameter weighing up to about 4,200 pounds. The BRU-32 includes two pairs of suspension hooks positioned 14 and 30 inches apart on the longitudinal centerline of the ejector unit rack. It is used to suspend single stores, as well as other ejector racks to include the BRU-33/A vertical ejector rack (VER), the BRU-33A/A canted vertical ejector rack (CVER), the BRU-55/A ejector rack, and the LAU-115/A, the LAU-117/A, and the LAU-118/A missile launchers by using a 14-inch suspension hook. The BRU-32 ejector uses two CCU-45/B Impulse Cartridges (CADs) to generate the required gas pressure for rack operations. The BRU-33/A vertical ejector rack assembly (VER) and BRU-33A/A canted vertical ejector rack (CVER) (not shown) may be suspended by the BRU-32 (series) bomb ejector rack. The BRU-33/A and BRU-33A/A have two ejectors used to carry two external stores weighing up to about 1,000 pounds each, 10 to 16 inches in diameter by using 14-inch suspension hooks. Each ejector uses two CCU-45/B CADs to generate the required gas pressure for rack operations. Thus, the BRU-33 requires a total of four CADs. The BRU-55 is capable of carrying two smart weapons (up to 1,000-pound class) on a single aircraft station, such as the Joint Stand-off Weapon (JSOW), and 1,000-pound Joint Direct Attack Munition (JDAM). Like the BRU-33, the BRU-55 has two ejector units that use two CCU-45/B CADs to generate the required gas pressure for rack operations. Thus, the BRU-55 requires four CADs except when it is dropping the SDB. To minimize the ejection force on the SDB, a dummy plug is inserted into one of the CAD cartridge holders while the other gets a CCU-45/B CAD to generate the required ejection forces.

An electrically-powered stores rack ejector system such as described herein may be used to retrofit and replace conventional systems such as the BRU-32, BRU-33, BRU-55, and compressor based pneumatic ejector systems such as the BRU-61. A housing of such an electrically-powered stores rack ejector may be of the same or similar size as a conventional system, may connect to an aircraft in the same way as a conventional system (e.g., may have attachment bolts in a same or similar pattern), may connect to an aircraft electrical and/or communication bus using the same or similar connectors used by a conventional system, may have hooks, hook spacing, and/or sway-bracing that are the same as or similar to those of a conventional system, and/or may otherwise by interchangeable with a conventional system. Also or alternatively, conventional systems may be modified to include electrically-powered ejection components such as are described herein. For example, the internal components within a housing unit of a conventional BRU, such as a piston and bomb release hooks, CAD cartridge holders, etc., may be replaced by components described herein.

Figure 1A:
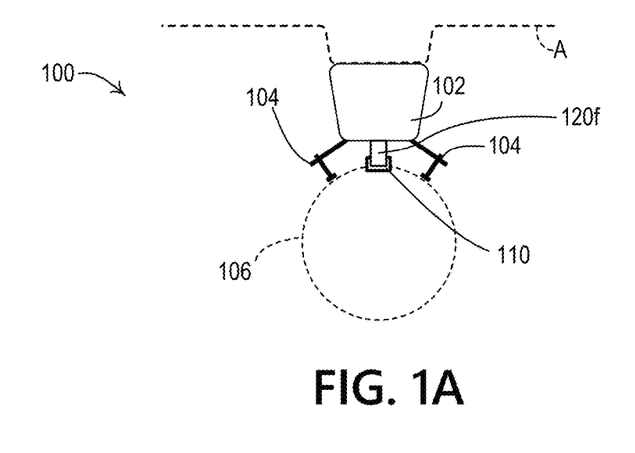
FIG. 1A is a front view of an example electrically-powered stores rack ejector.

FIG. 1A is a front view of an electrically-powered stores rack ejector system 100. Although described herein in using an example of a bomb as a type of store (and with associated use of the system 100 as a bomb rack ejector), the system 100 may be used with other types of stores. The system 100 may include a housing 102 that may be configured for attachment directly to an aircraft A. The system may be attached to a pylon, hardpoint, or other attachment location on a wing or fuselage of an aircraft, and/or may be attached via other carriage equipment. Housing 102 may include sway brace assemblies 104. The housing 102 may also include a front suspension hook 120f and a rear suspension hook 120r (shown in FIG. 1B). The front suspension hook 120f may secure a store 106 by hooking a suspension lug 110. The rear suspension hook 120r may similarly hook another suspension lug (not shown). During a commanded release, the suspension hooks 120f and 120r may be commanded to a released or open position and ejector feet (described below) may impart a force on the weapon 106 to push it away from the aircraft A.

Figure 1B:
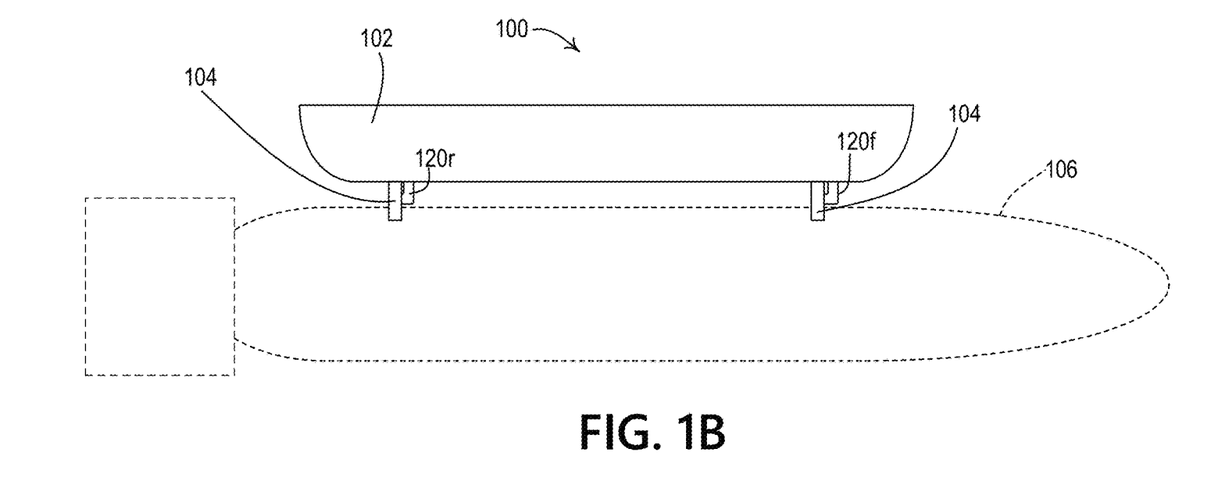
FIG. 1B is a side view of the electrically-powered stores rack ejector of FIG. 1A.

FIG. 1B is a side view of the electrically-powered stores rack ejector system 100 of FIG. 1A. The sway brace assemblies 104 may prevent the store 106 from rocking sideways as the aircraft A maneuvers and are provided to steady the store 106. The sway brace assemblies 104 may be bolted to the housing 102 or to a rack frame within the housing 102. The sway brace assemblies 104 may be automatically or manually adjusted.

Figure 2:
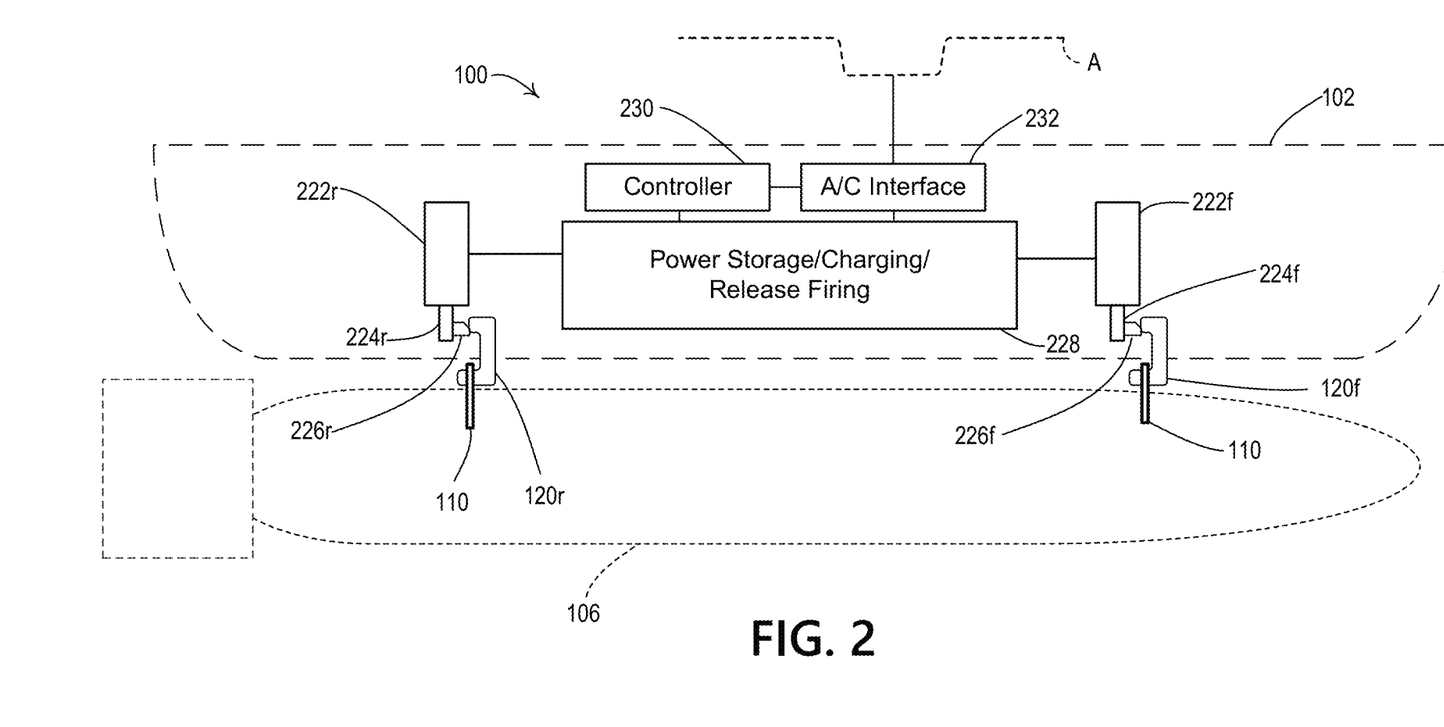
FIG. 2 is a partially-schematic side view of the electrically-powered stores rack ejector of FIGS. 1A and 1B.

FIG. 2 is a partially-schematic side view of the electrically-powered stores rack ejector system 100. The housing 102 may include a front solenoid 222f and a rear solenoid 222r. A front ejector foot 224f may be integrally formed with, or otherwise connected to, a piston of the front solenoid 222f. A rear ejector foot 224r may be integrally formed with, or otherwise connected to, a piston of the rear solenoid 222r. As explained in more detail below, the ejector feet 224f and 224r may include respective stops 226f and 226r to prevent suspension hooks 120f and 120r from opening prematurely. The system 100 may comprise a power storage/charging/release firing system 228. As described in more detail below in connection with FIG. 4, the system 228 may be configured to store energy used to actuate the solenoids 222 and further configured to release that stored energy to the solenoids 222. A control system 230 may include one or more processors that, by executing instructions (e.g., stored in memory of the control system 230) control operation of the system 228. The control system 230 and/or the power storage/charging/release firing system 228 may receive, via an aircraft interface 232, electrical power and control signals from power and/or communication busses of the aircraft A.

In order to release a weapon effectively and safely from an aircraft, two actions—in most conventional systems—occur in rapid succession: 1) release of bomb suspension/retention hooks holding the weapon; and 2) extension or downward motion of an ejector foot or piston that accelerates the weapon away from the aircraft. Conventional bomb release hooks may comprise a pivoting mechanical element that is released from a holding position by mechanical linkage that is driven from the same expanding gas from CADs at the time of a command to release the weapon. In an electrically-power stores ejector system such as the system 100, a solenoid or multiple solenoids may actuate one or more ejector feet and the bomb release hooks.

Figure 3A:
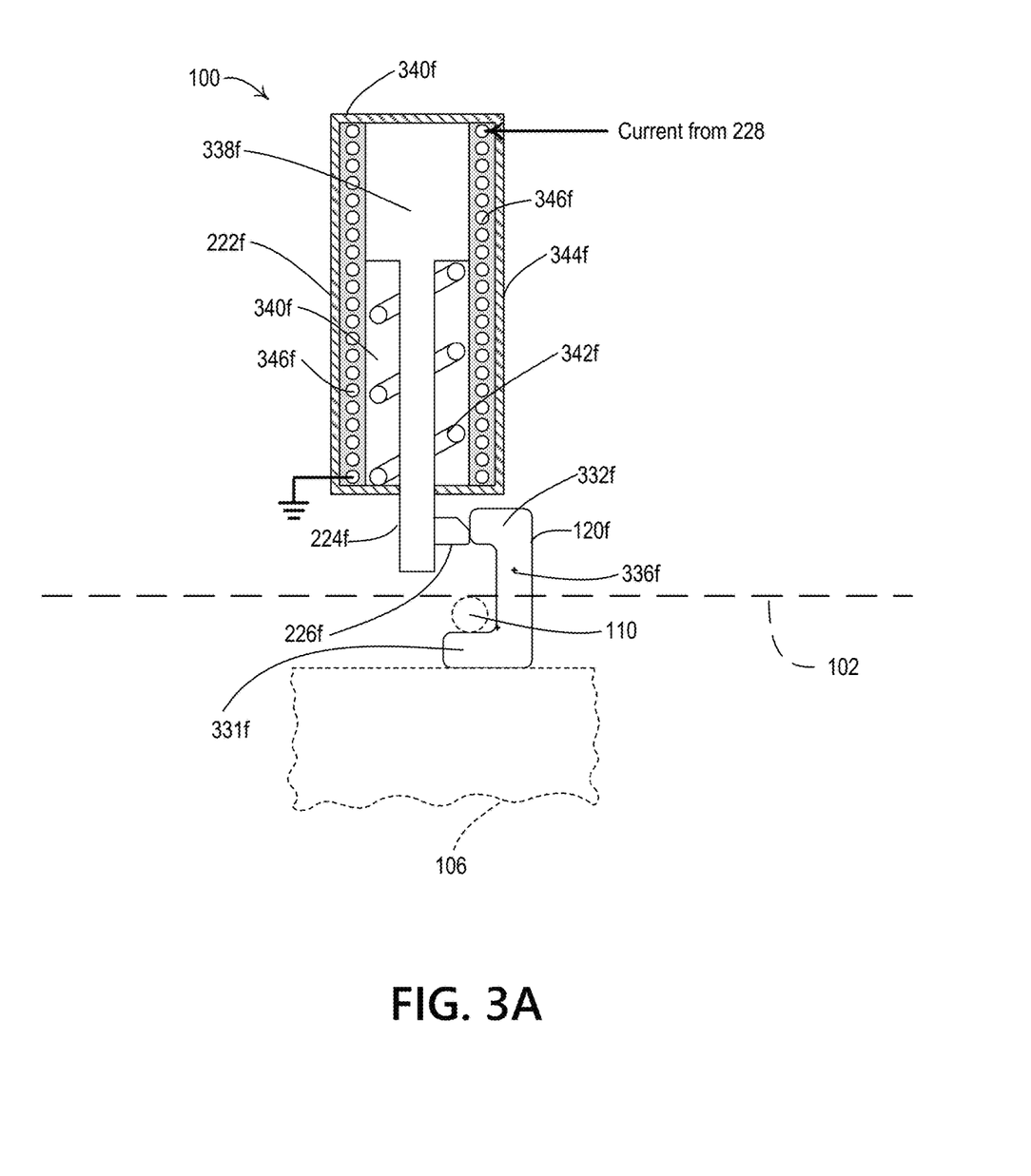
FIG. 3A is a partially-schematic side view of a portion of the electrically-powered stores rack ejector of FIGS. 1A and 1B with a weapon in a secured and locked position.

FIG. 3A is a partially-schematic side view of a portion of the electrically-powered stores rack ejector system 100 that comprises the front solenoid 222f, the front ejector foot 224f, and the front suspension hook 120f. The rear solenoid 222r, the rear ejector foot 224r, and the rear suspension hook 120r may operate in a manner similar to that described for the front solenoid 222f, the front ejector foot 224f, and the front suspension hook 120f.

The front suspension hook 120f includes a bottom portion 331f that engages with one of the lugs 110 of the store 106. The front suspension hook 120f further includes a top portion 332f that, prior to extension of the ejector foot 224f, abuts the stop 226f that is attached to the ejector foot 224f. In the configuration shown in FIG. 3A, the front suspension hook 120f is in a closed and locked position around the front suspension lug 110 of the store 106. In this configuration, the abutment of the stops 332f and 226f prevents rotation of the front suspension hook 120f about a pivot 336f.

Figure 3B:
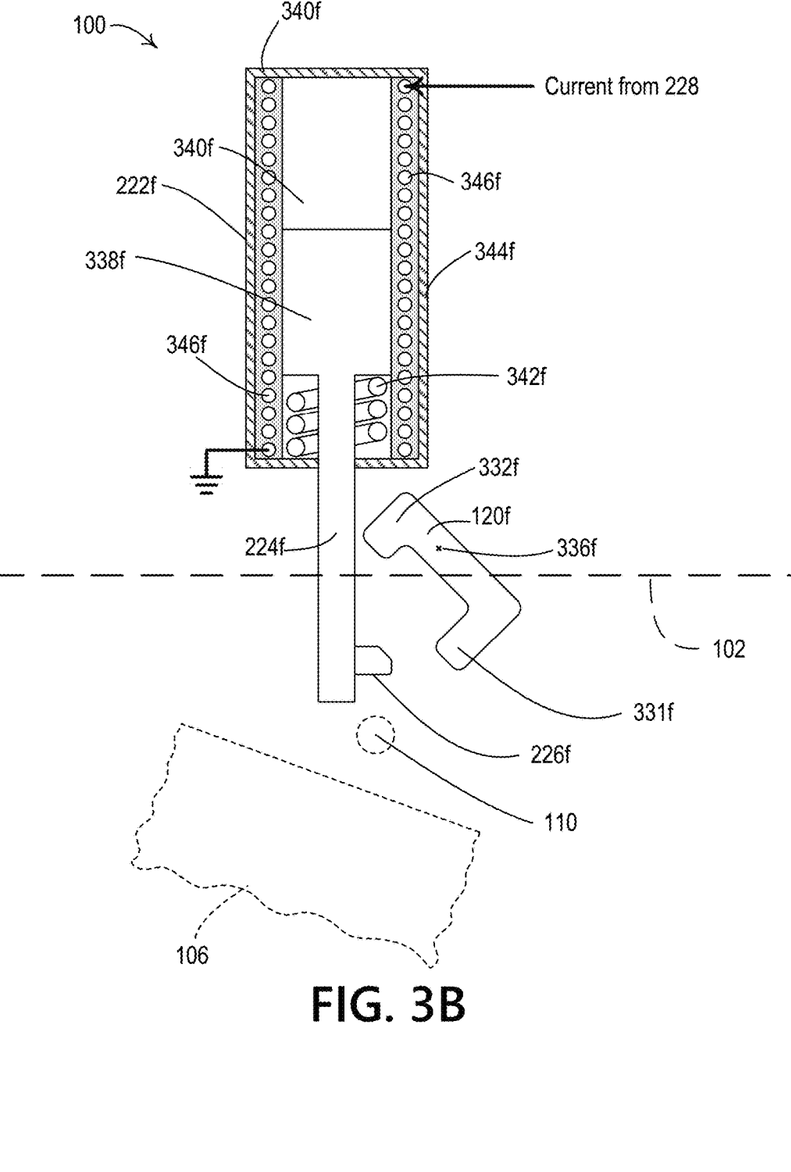
FIG. 3B is a partially-schematic side view of the same portion of the electrical powered stores rack ejector shown in FIG. 3A, but in an open position with the weapon ejected/released.

The front solenoid 222f is shown in FIGS. 3A and 3B in an area cross-sectional view through a longitudinal axis of the ejector foot 224f. The rear solenoid 222r may have a structure that is the same as or similar to that of the front solenoid 222f. The front solenoid 222f may comprise a case 344f. The ejector foot 224f may extend from an opening in the bottom of the case 344f. The ejector foot 224f may be part of, or otherwise joined to, a plunger 338f that is movable in a cylinder 340f. A spring 342f may bias the plunger 338f upward when the solenoid 222f is not energized, thereby causing the ejector foot 224f to be biased to the retracted position shown in FIG. 3A. A coil 346f may surround the cylinder 340f. When an electrical current is applied to the coil 346f (e.g., from the "current from 228" input indicated in FIG. 3A, through the coil 346f, and to ground), the plunger 338 is forced downward, thereby compressing the spring 342f and causing the ejector foot 224f to extend.

FIG. 3B is a partially-schematic side view of the same portion of the system 100 in FIG. 3A, but in an open position after with the store 106 has been ejected/released. Upon command to release the store 106, the front solenoid 222f may be actuated (e.g., electrical current applied to the coil 3460. The rear solenoid 222r may also be actuated at the same time. Actuation of the solenoids 222f and 222r causes the ejector foot 224f and the ejector foot 224r to move downward. The initial part of the downward stroke of the ejector foot 222f moves the stop 226f out of inference with the stop 332f, thereby allowing the front suspension hook 120f to rotate about the pivot 336f. Similarly, an initial part of the downward stroke of the ejector foot 222r moves stop 226r on the ejector foot 222r out of inference with a stop (similar to the stop 3320 of the rear suspension hook 120r, thereby allowing the rear suspension hook 120r to rotate about a pivot similar to the pivot 336f. As the ejector foot 222f and the ejector foot 222r continue downward, they impart a force on the store 106 and push the store 106 away from the aircraft A.

In order to cause rotation of the suspension hooks 120f and 120r to the configurations such as that shown in FIG. 3B, a top of the bottom portion 331f (and a top of a similar bottom portion of the hook 120r) may be inclined so that downward force (from the weight of the store 106 and/or force of airflow against the store 106) from the lug 110 tends to push the bottom of the hook 120f (and the bottom of the hook 120r) forward. Also or alternatively, the suspension hooks 120f and 120r may be rotationally biased to a configuration such as that shown in FIG. 3B. Also or alternatively, the ejector feet 224f and 224r may be separately coupled (e.g., via cams and/or other linkages) to the suspension hooks 120f and 120r such that downward movement of the ejector feet 224f and 224r exerts force of the top and or bottom portions of the suspension hooks 120f and 120r to cause rotation of the suspension hooks 120f and 120r. Also or alternatively, rotation of the suspension hooks 120f and 120r may be controlled by separate solenoids or other actuators.

FIGS. 3A and 3B show an example of mechanical interaction between an extending ejector foot and a suspension hook. Other types of mechanical linkages (e.g., similar to linkages used to release suspension hooks in existing bomb racks) may also or alternatively be used.

Figure 4:
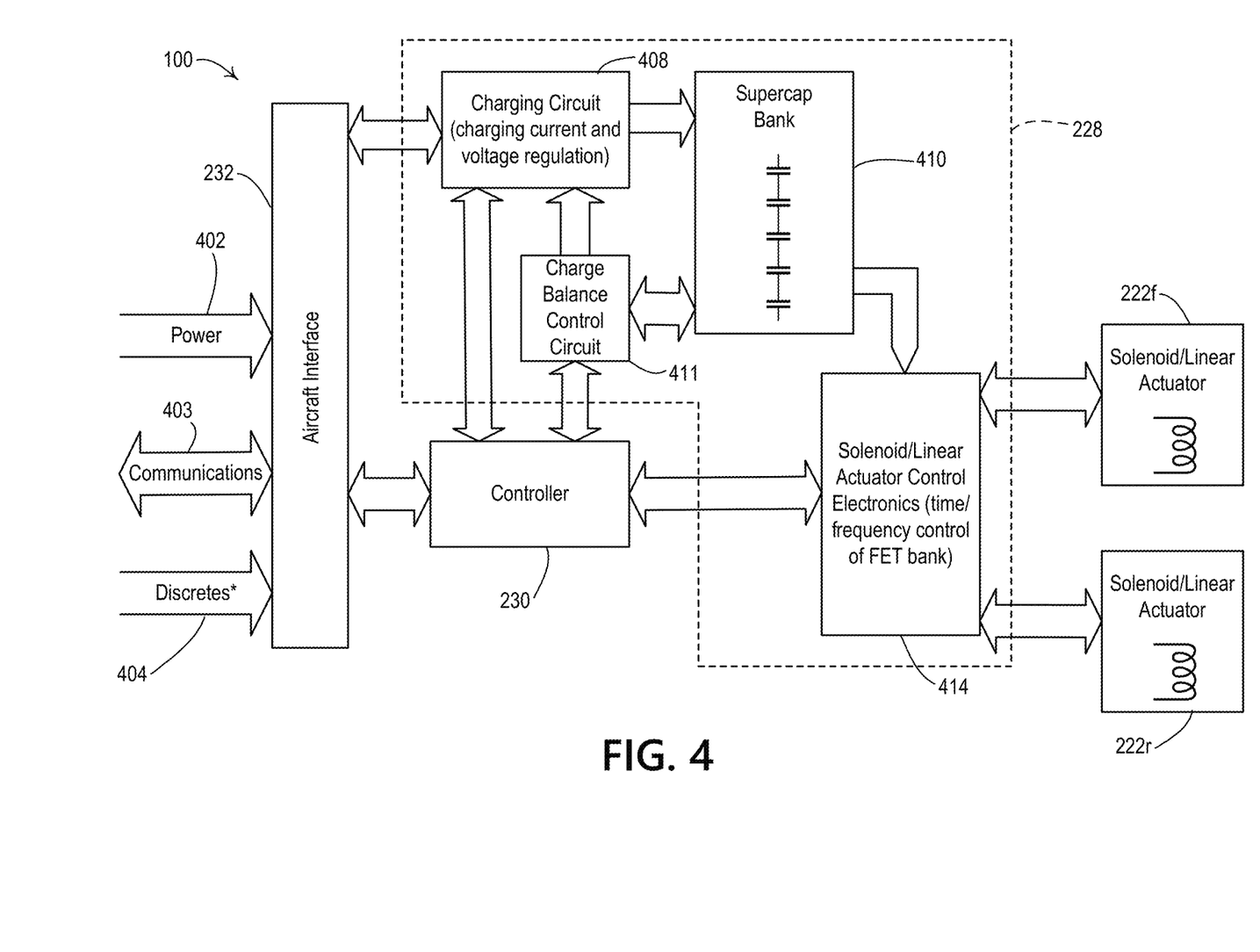
FIG. 4 is a block diagram showing example components of the electrically-powered stores rack ejector of FIGS. 1A and 1B.

FIG. 4 is a block diagram showing additional components of the electrically-powered stores rack ejector system 100 configured to eject and release stores (e.g., munitions from 200 pounds to 4,200 pounds) using aircraft electrical power 402 from the aircraft A. The electrical power 402 may be generated from a MIL-STD-704 aircraft power system including power at the 28 Volt DC, 115 Volt 3-phase 400 Hz AC, and 270V DC levels, all at 10 Amps. The system 100 may include an aircraft interface 232 and may be configured to communicate with and/or receive power 402, communications 403, and discrete signals 404 from the aircraft A according to one or more standards, such as the MIL-STD-1760, MIL-STD-1553, or other Aircraft/Store Electrical Interconnection System interface standards. Prior to stores release, the aircraft A may activate a release consent discrete and may send the store 106 an arming command using the aircraft interface 406. The aircraft stores management system (SMS) may verify that the stores release conditions have all been fulfilled, and it will activate the signals that cause the store 106 to be released. The required circuitry and electrical cable(s) may be located inside of the bomb rack ejector housing. The circuitry may comprise the controller 230, which may in turn comprise one or more processors executing instructions stored in a memory. The aircraft interface 232 may also process and pass communications 403, such as signals and status from various bomb rack functions, the status of the various munitions back to the aircraft, as well as discrete signals/commands 404, such as programming and fuzing information to munitions. The aircraft interface 232 may also supply power 402, communications 403, and weapon control functions 404 to the stores ejector rack in a similar fashion as conventional systems.

As also shown in FIG. 4, the electrically-powered stores rack ejector system 100 may include a power conversion charger 408 and associated charging circuitry. The power conversion charger 408, under control of the controller 230, may generate a charging current and/or voltage different from that of power supply 402 and may apply that generated charging current and/or voltage to charge an energy storage system 410. Also or alternatively, the power conversion charger 408 and related charging circuitry may be controlled by the controller 230 and by a charge balance control circuit 411, with the charge balance control circuit 411 being controlled by and/or providing data to the controller 230. The power conversion charger/charging circuit 408 may charge an energy storage system 410 with the generated charging current/voltage. The charge balance control unit 411 and related circuitry may regulate the charging of the energy storage system 410 based upon firing power requirements such as stores type, quantity, release profiles, etc. The energy storage system 410 may comprise a capacitor, or a super capacitor bank, a battery, a series of batteries, or other energy storage device and required circuitry. Capacitors in the capacitor bank 410 may be configured in series and/or in parallel. The stored energy may be released into the solenoids 222*f* and 222*r*, under the control of release software executed by the controller 230, using solid-state field-effect transistors (FETs) of solenoid linear actuator control electronics 414. The release software may execute stored profiles that may be programmed as part of the aircraft Operational Flight Program (OFP) or loaded via a MIL-STD-1553 bus. Upon command to release a store, the controller 230 may instruct the solenoid/linear actuator firing and control electronics 414 to energize/actuate the solenoids 222*f* and 222*r*. The actuated solenoids 222*f* and 222*r* may extend ejector feet 224*f* and 224*r* to impart a release force on the store 106 to separate the store 106 from the aircraft A. As previously discussed, the solenoid(s) 222*f* and 222*r* may also be configured to simultaneously release bomb suspension hooks securing a munition or other store to the bomb rack ejector upon actuation of the ejector foot as shown in FIGS. 3A and 3B. Components and related circuits shown in FIG. 4 may be scalable, to include numbers of system components and physical size, to meet firing power requirements.

Figure 5:
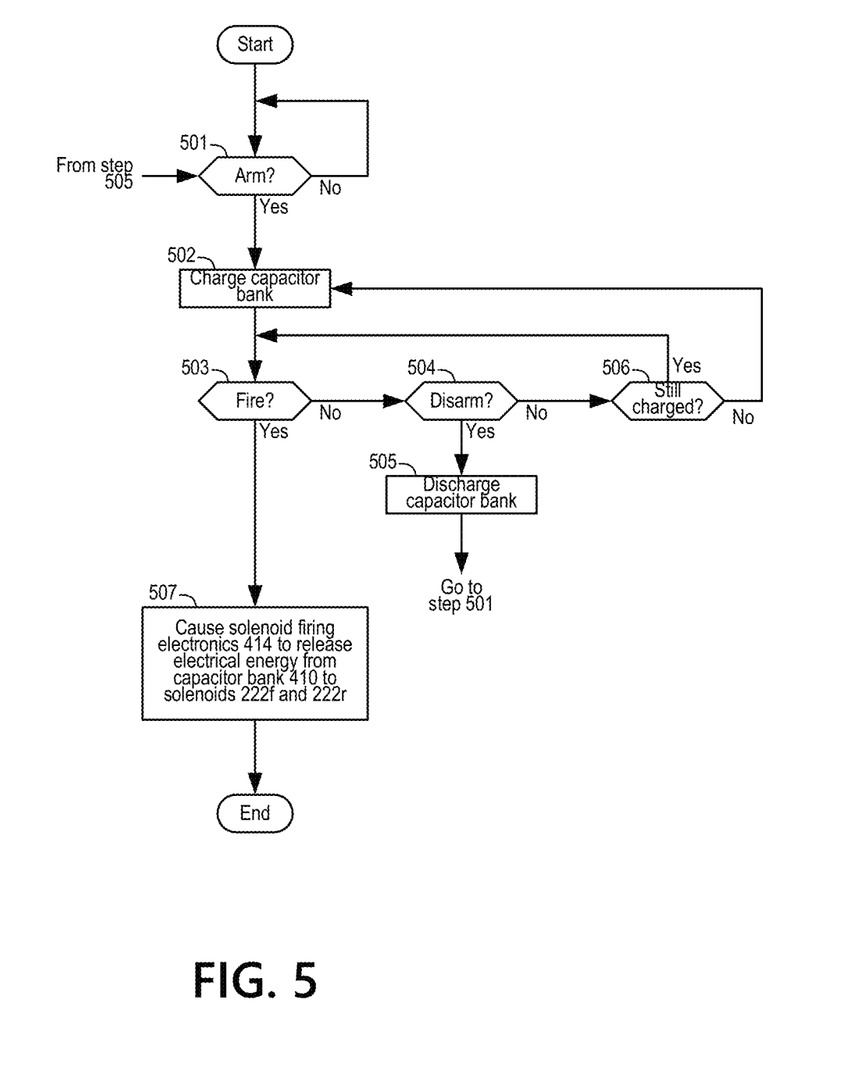
FIG. 5 is a flow chart showing steps of an example method for operating the electrically-powered stores rack ejector of FIGS. 1A and 1B.

FIG. 5 is a flow chart showing steps of an example method associated with operating the electrically-powered bomb stores ejector of FIGS. 1A and 1B. One, some, or all steps of the example method of FIG. 5 may be performed by the controller 230. Also or alternatively, one, some, or all steps of the example method of FIG. 5 may be performed by one or more other computing devices. One or more steps of the example method of FIG. 5, and/or one or more communications/signals described in connection with the method of FIG. 5, may be rearranged (e.g., performed, sent, or received in a different order), omitted, and/or otherwise modified, and/or other steps and/or communications/signals added. A communication/signal described in connection with the example method of FIG. 5 need not be a single message nor contained in a single packet, block, or other transmission unit.

In step 501, the controller 230 may determine if the aircraft and/or stores management system (SMS) is armed or safe. If no, step 501 may be repeated. If yes (e.g., the pilot arms the system 100 and or weapon(s) carried by the system 100), step 502 may be performed.

In step 502, the controller 230 may cause the energy storage system 410 (and/or the charge balance control circuit 411) to charge the energy storage system 410 to a predetermined level based upon firing power requirements such as ordnance type, quantity, release profiles, etc. The charge balance control circuit 411 and related circuitry may regulate the charging of the energy storage system 410 based upon firing power requirements such as ordnance type, quantity, release profiles, etc., as previously described.

In step 503, the controller 230 may determine if a communication or signal has been received to "fire" the solenoids 222*f* and 222*r* and initiate the release of a store. If no, step 504 may be performed. If yes (e.g., the pilot commands a weapon release), step 507 may be performed.

In step 504, the controller 230 may determine if a communication or signal has been received to disarm the system 100. If yes (e.g., the pilot has selected to de-arm the system 100 and/or weapon(s) held in the system 100), step 505 may be performed. If no, step 506 may be performed.

In step 505, the controller 230 may send one or more signals that cause the charging circuit 408, the charge balance control circuit 411, and/or other circuits to discharge the energy storage system 410. Upon discharge of the energy storage system 410, step 501 may be repeated. Alternatively, following a "yes" determination in step 504, step 505 may be omitted and the energy storage system 410 may be allowed to remain in a charged condition (e.g., for use if the system 100 is re-armed, and/or to be discharged via a separate procedure if a fire command is not later received).

In step 506, the controller 230 may determine whether the energy storage system 410 is still adequately charged. For example, if the system 100 has been armed for an extended period, charge of capacitors in the energy storage system 410 may have degraded. An adequate charge level may be a charge level high enough to still activate the solenoids 222*f* and 222*r*. If yes, step 503 may be repeated. If no, step 502 may be repeated to ensure the energy storage system 410 is adequately charged to provide the solenoids enough activation energy.

If the controller 230 determines in step 503 that a "fire" command to release a store has been received (e.g., the pilot has fired/pickled a weapon), controller 230 may in step 507 cause the solenoid/linear actuator firing and control electronics 414 to release the electrical energy of the energy storage system 410 to energize and fire solenoids 222*f* and 222*r*. The actuated solenoids 222*f* and 222*r* may extend the ejector feet 224*f* and 224*r* to impart a release force on the store to separate the store from the aircraft. Also or alternatively, solenoids 222*f* and 222*r* may also be configured to simultaneously release bomb suspension hooks 120*f* and 120*r* securing the store to the bomb rack ejector upon actuation of the ejector foot 224*f* and 224*r* as shown in FIGS. 3A and 3B and as previously described.

The energy needed to safely and reliably eject a store from an aircraft may be determined by analyzing conventional pyrotechnic based systems. For example, ejection of a 500-pound bomb from a BRU-55 may be analyzed for conversion to ejection of an SDB. As shown in Table 1 below, the analysis indicates a required separation velocity of 22.5 feet per second, having a kinetic energy of 127K foot-pounds or 5.3 Kilo-joules, which is converted to 89.1 Watt-minutes since the ordnance ejector disclosed herein may require an electrical energy storage device for power.

TABLE 1

Weapon Energy Required

| Item | units (Imperial) | | units (metric) | |
| --- | --- | --- | --- | --- |
| bomb weight | 500 | lbs | 227.273 | kg |
| initial velocity | 0 | ft/sec | 0.000 | m/sec |
| final velocity | 22.5 | ft/sec | 6.858 | m/sec |
| time (until final v.) | 0.05 | sec | 0.050 | sec |
| avg. acceleration | 450 | ft/sec^2 | 137.160 | m/sec^2 |
| final velocity | 22.5 | ft/sec | 6.858 | m/sec |
| kinetic energy | 126,563 | ft*lbs. | 5344.564 | Nm (joules) |
| | | | 1.485 | Watt-hr |
| | | | 89.076 | Watt-min |

Existing aircraft electrical systems may not support such a power requirement without additional energy storage elements. For example, a separation time of 50 milliseconds requires a power level of 106K Watts for direct power separation without additional energy storage. Such a power lever at 270V is nearly 400A with no incidental energy losses. As disclosed herein, the electrical energy storage device power requirements, however, are within the power capabilities of conventional combat aircraft. Assuming a system power requirement of less than ⅓ of the full capability, and a loss of 50% of the electrical energy conversion to kinetic energy to the ejected weapon, the 270 VDC MIL-STD-704 aircraft power is capable of delivering 10 Amps. Assuming a draw of no more than 3 Amps, the resulting power rate is 810 Watts. Table 2 below shows the calculations for the time it would take to harvest the required energy from the aircraft for a 50% efficient system. As such, only about 13 seconds of ⅓ of the available aircraft power may be needed to store the required energy in the electrical energy storage system 410 disclosed herein. In some examples, a slower charge rate may be implemented to satisfy the requirements of the electrical energy storage device and in an effort to minimize the size, weight, and power handling requirements of storage device and related circuitry.

TABLE 2

Aircraft Power Required
Aircraft Power units

Voltage

| 270.00 | Volts |
| --- | --- |

Current draw

| 3.00 | Amps |
| --- | --- |

Power

| 810 | Watts |
| --- | --- |

Energy require at 50% loss

| 178.15 | Watt-Min |
| --- | --- |

Time to store required energy

| 0.22 | minutes |
| --- | --- |
| 13.2 | seconds |

An electrically-powered stores rack ejector such as is described herein may provide decreased maintenance requirements, increased flexibility, and improved safety over conventional explosive devices and high-pressure systems. An additional advantage of such an electrically-powered stores rack ejector system is the ability to remove available energy easily in flight to disarm or inactivate the system— the energy storage system 410 may be easily discharged prior to landing via the aircraft interface both automatically, such as upon extension of landing gear, or on command by the pilot prior to landing. In addition, the stores ejector system and/or the electrical energy storage system may include shorting elements to provide a failsafe element across the solenoids to prevent accidental and failure mode firing.

Energy storage and release requirements for the systems disclosed herein may be sizable. For example, the energy stored on a capacitor or capacitor bank that may be used as the energy storage device is given by:

$$E_{cap} = CV^2/2$$

A stores rack ejector such as is described herein may have an energy storage requirement that is less than about 5400 joules at 16V, where C is available supercap voltage. Solving for C yields: C=5400(2)/162=42 Farads. $E_{cap}=(42)(16)^2=5,376$ joules. With a slight increase in voltage to 28V, provided by a MIL-STD-704 available voltage, drops the energy storage device requirement to 14 Farads.

As described above, the energy storage device may comprise a capacitor, or a super capacitor bank, a battery, a series of batteries, or other energy storage device. The capacitors described herein may comprise commercial off-the-shelf technology or may be specially designed to provide the specific energy requirements to power the electrically-powered bomb rack ejector of FIGS. 1A and 1B. A super capacitor bank may be a grouping of capacitors connected in series and/or in parallel.

As indicated above, an electrically-powered stores rack ejector system may comprise an electromechanical solenoid that may comprise an electromagnetically inductive coil (e.g., the coil 3460 wound about a movable steel or iron slug, or armature (e.g., the piston 3380. The coil may be shaped such that the armature may be reciprocated from the space or gap in the center of the coil. This may alter the inductance of the coil thus creating an electromagnet. The movement or reciprocating of the armature may be used to impart a force on the ejector foot and/or suspension hooks. In other examples, there may be a direct mechanical linkage between the solenoid armature and/or the suspension lugs. In still other examples, the ejector foot may be modified to function as an ejector foot/armature integrated with the electromagnetic coil. In some examples, the solenoid may generate a mechanical force of at least, or between, about 250, 300, 350, 400, 450, 500, 550, 600, 650, 700, 750, 800, 850, 900, 950, 1000, 1500, 2000, 2500, 3000, 3500, 4000, 4500, 5000, 5500, 6000, 6500, 7000, 7500, 8000, 8500, 9000, 9500 to about 10,000 pounds.

The solenoids described above may comprise commercial off-the-shelf technology or may be specially fabricated to achieve the required parameters, such as ejection force and stroke length, to safely and effectively eject a store from the electrically-powered bomb rack ejector of FIGS. 1A and 1B. For example, the use of multiple sequential coils driven by microprocessor-controlled switches may aid in tailoring the driven force profile and extending the solenoid throw or length of travel. In some examples, the solenoid may have a throw or length of travel of at least, or between, about 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5 to about 10.0 inches.

Figure 6A:
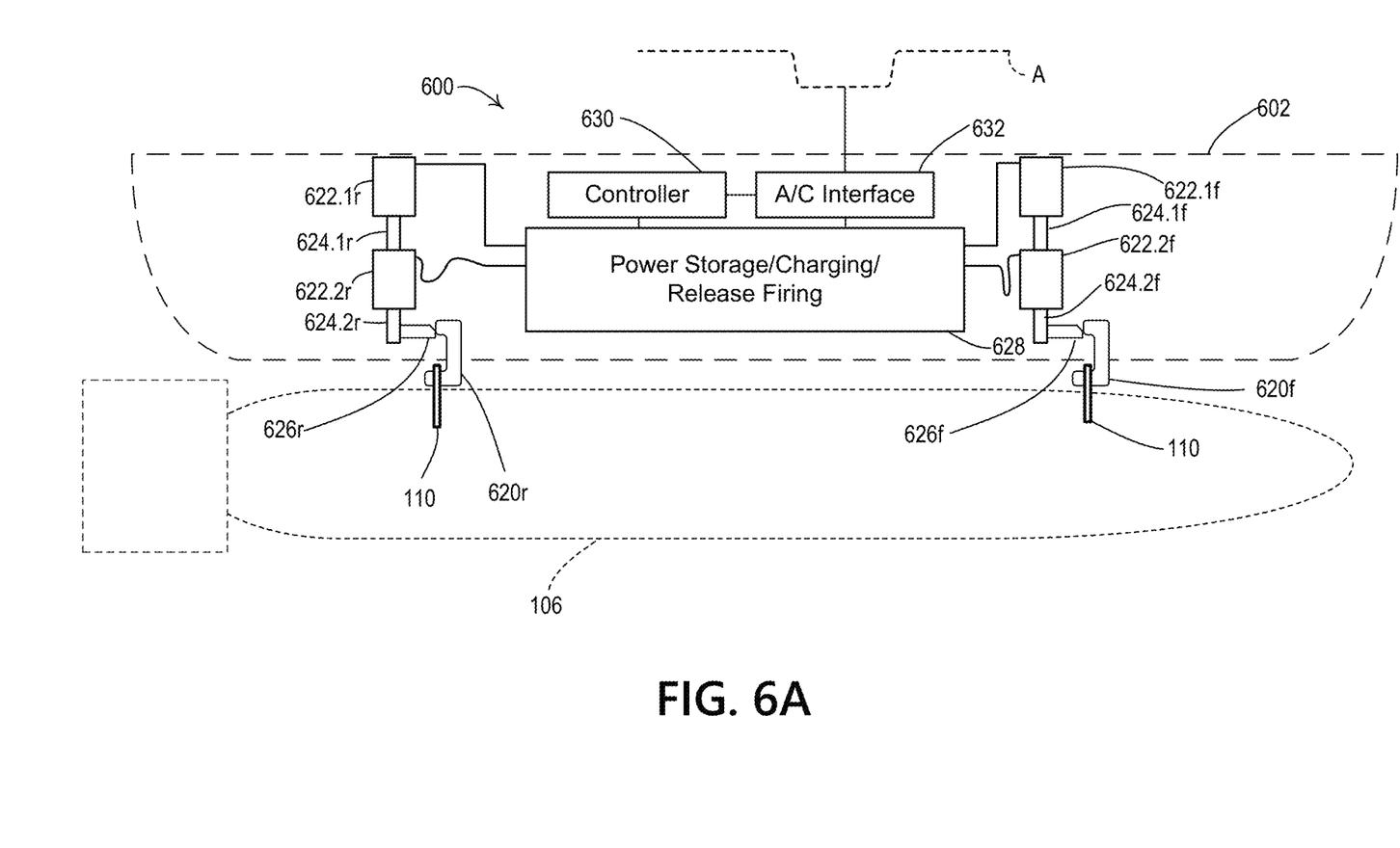
FIGS. 6A and 6B are partially-schematic side views of another electrically-powered stores rack ejector.
Figure 6B:
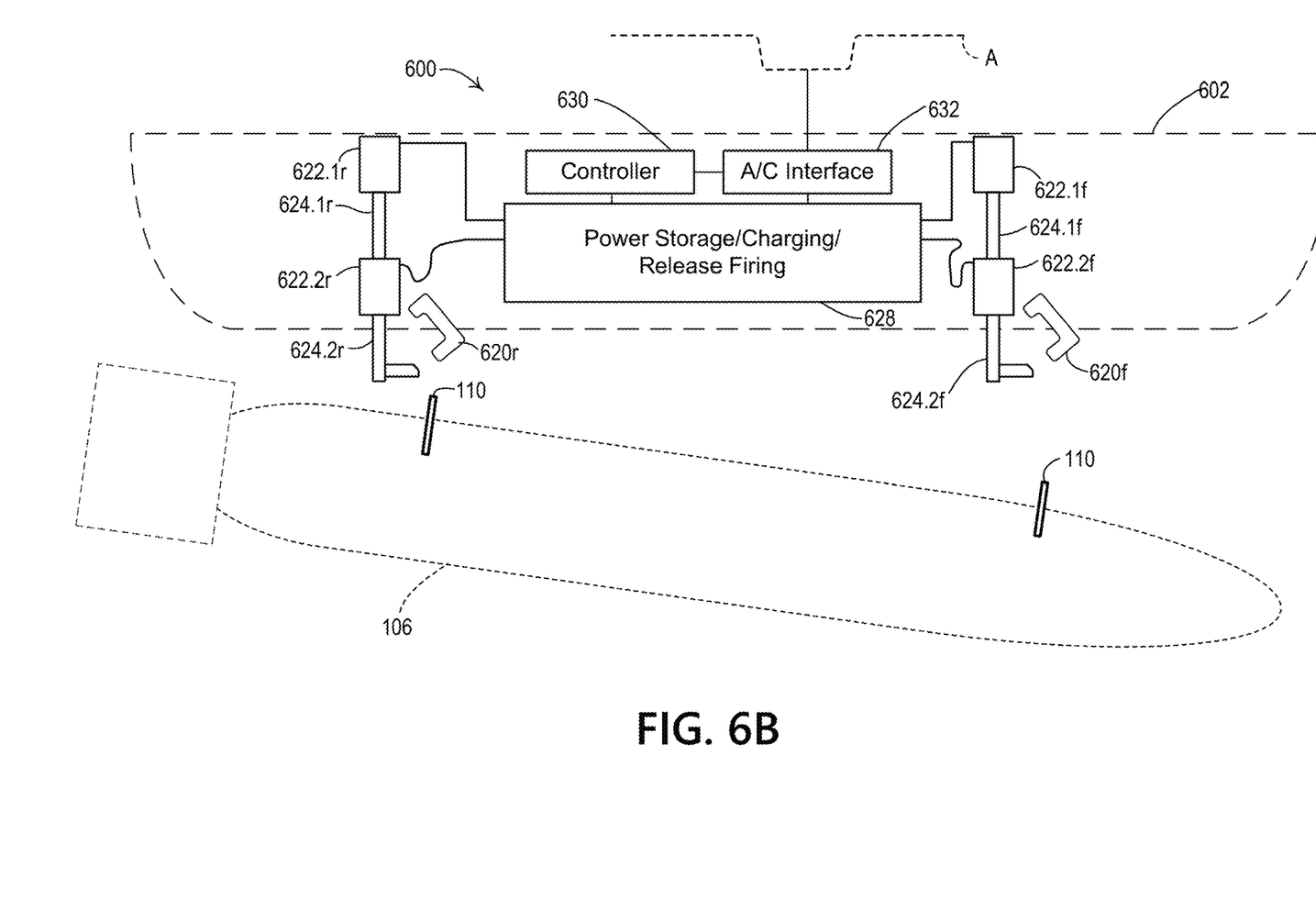

Also or alternatively, solenoids may be arranged in parallel to increase stroke length. FIG. 6A is a partially-schematic side view of an electrically-powered stores rack ejector system 600 that includes an example of such an arrangement. The system 600 may comprise a housing 602, a controller 630, an interface 632, a power storage/charging/release firing system 628, and suspension hooks 620$f$ and 620$r$ that are respectively similar to the housing 102, the controller 230, the interface 232, the power storage/charging/release firing system 228, and the suspension hooks 120$f$ and 120$r$ of the system 100. Instead of the solenoid 222$f$ with ejector foot 224$f$, the system 600 includes solenoids 622.1$f$ and 622.2$f$ arranged in series. An ejector foot 624.1$f$ of the solenoid 622.1$f$ is coupled to a housing of the solenoid 622.2$f$, which includes an ejector foot 624.2$f$ and stop 626$f$. Similarly, and instead of the solenoid 222$r$ with ejector foot 224$r$, the system 600 includes solenoids 622.1$r$ and 622.2$r$ arranged in series. An ejector foot 624.1$r$ of the solenoid 622.1$r$ is coupled to a housing of the solenoid 622.2$r$, which includes an ejector foot 624.2$r$. FIG. 6B is a partially-schematic side view of the ejector system 600 after firing. The ejector foot 624.1$f$ has extended and displaced the housing of the solenoid 622.2$f$, and the ejector foot 624.2$f$ has extended to push away the store 106. Similarly, the ejector foot 624.1$r$ has extended and displaced the housing of the solenoid 622.2$r$, and the ejector foot 624.2$r$ has extended to push away the store 106. The controller 630 and the power storage/charging/release firing system 628 may operate similar to the controller 230 and the power storage/charging/release firing system 228, but with modifications to account for the added solenoids.

Figure 7A:
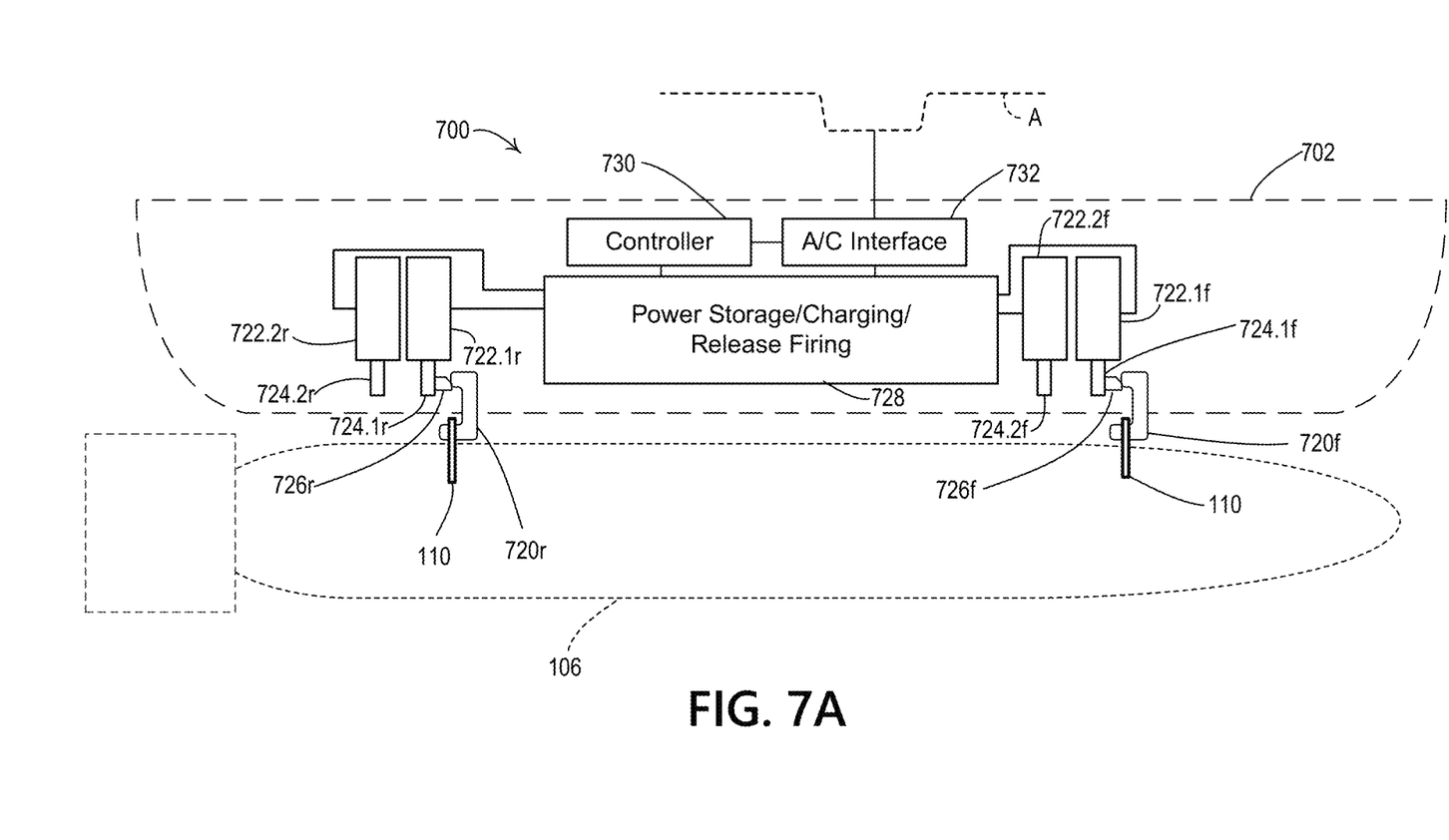
FIGS. 7A and 7B are partially-schematic side views of another electrically-powered stores rack ejector.
Figure 7B:
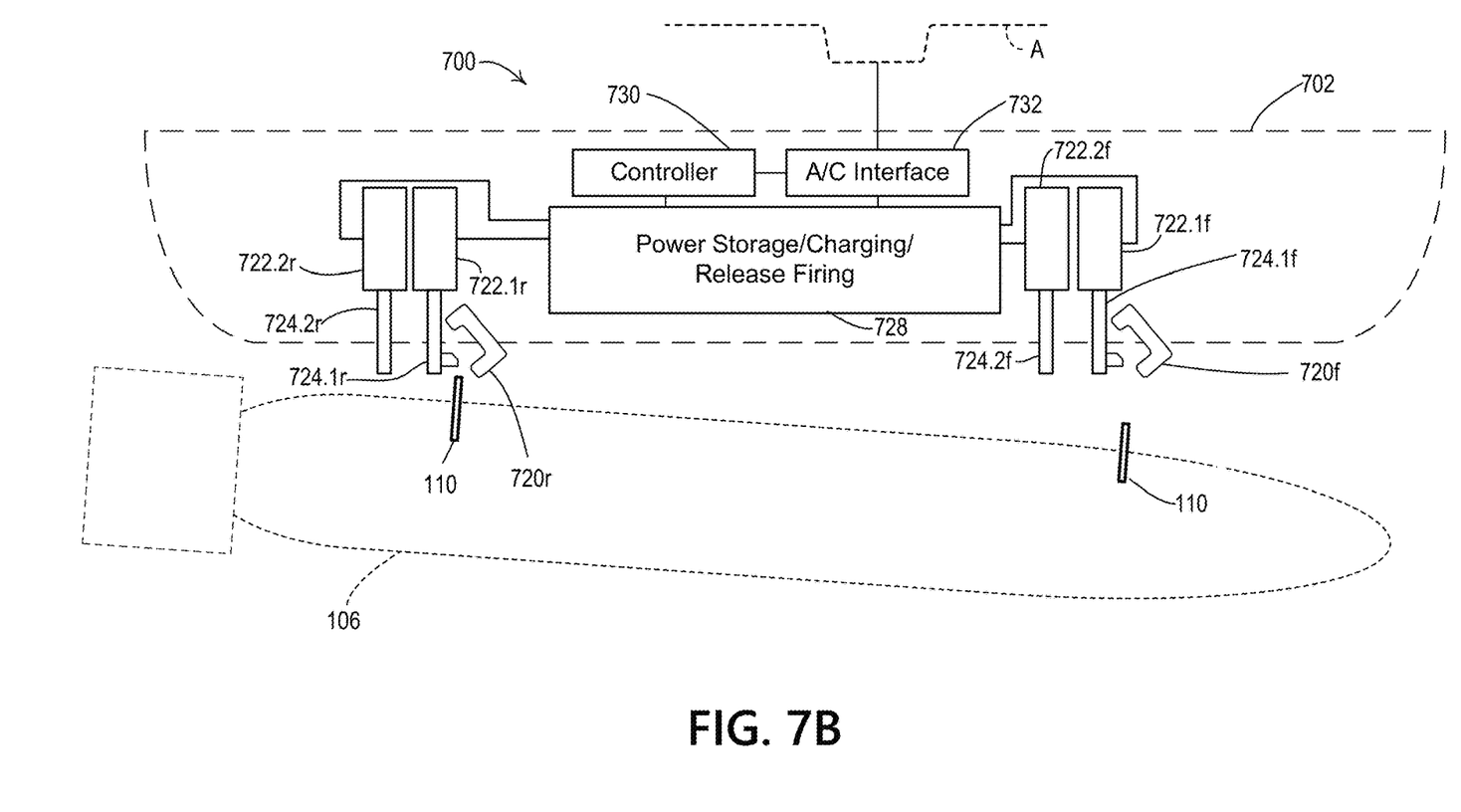

Also or alternatively, solenoids may be arranged in parallel to increase ejection force. FIG. 7A is a partially-schematic side view of an electrically-powered stores rack ejector system 700 that includes an example of such an arrangement. The system 700 may comprise a housing 702, a controller 730, an interface 732, a power storage/charging/release firing system 728, and suspension hooks 720$f$ and 720$r$ that are respectively similar to the housing 102, the controller 230, the interface 232, the power storage/charging/release firing system 228, and the suspension hooks 120$f$ and 120$r$ of the system 100. Instead of the solenoid 222$f$ with ejector foot 224$f$, the system 700 includes solenoids 722.1$f$ and 722.2$f$ arranged in parallel. An ejector foot 724.1$f$ of the solenoid 722.1$f$ includes a stop 726$f$. The solenoid 722.2$f$ includes an ejector foot 724.2$f$. Similarly, and instead of the solenoid 222$r$ with ejector foot 224$r$, the system 700 includes solenoids 722.1$r$ and 722.2$r$ arranged in parallel. An ejector foot 724.1$r$ of the solenoid 722.1$r$ includes a stop 726$r$. The solenoid 722.2$r$ includes an ejector foot 724.2$r$. FIG. 7B is a partially-schematic side view of the ejector system 700 after firing. The ejector feet 724.1$f$, 724.2$f$, 724.1$r$, and 724.2$r$ have extended to push away the store 106. The controller 730 and the power storage/charging/release firing system 728 may operate similar to the controller 230 and the power storage/charging/release firing system 228, but with modifications to account for the added solenoids.

Any type of air-to-ground munitions, such as bombs, may be used with a stores rack ejector disclosed herein. Exemplary air-to-ground munitions which may be installed using the bomb rack ejector disclosed herein may include Mk-82 series bombs, tactical air launched decoys (TALD), practice bombs such as the Mk-76, BDU-33, LGTR (Laser Guided Training Round), or "smart" bombs such as laser guided bombs to include Guided Bomb Units (GBU), such as GBU-10, GBU-12, GBU-16, GBU-24, JDAM series bombs, JSOW, and/or GBU-39 series (Small Diameter Bomb) bombs; mines, such as Destructor MK 36, MK 40, and/or MK 41 mines; and/or MK 20, CBU-99, and/or CBU-100 series cluster bombs, rocket pods such as the LAU-10 and LAU-68 series, and dispensers such as the SUU-20 and SUU-25.

The stores ejector disclosed herein may include enhanced capabilities not currently available to current explosive and pneumatic systems. For example, the stores ejector disclosed herein may be programmable to release similar or dissimilar types of weapons simultaneously from the same bomb rack or from different or multiple bomb racks. Conventional systems have limited capabilities with multiple weapon loadouts because the force required to release ordnance from an aircraft varies significantly between different types of weapons. The use of a controller to regulate a quantity of energy that may be released into the solenoid(s) disclosed may allow for preprogramed profiles for multiple weapons and release parameters or conditions, as well as for various pilot or mission profile adaptable release configurations. In other words, the force curve required for different types of weapons may be easily changed or modified. A controller disclosed herein may be cockpit programmable/selectable inflight by a pilot or weapon systems officer. In other examples, the controller may be programmed from the ground by maintenance personal or aircrew. In still other examples, specific weapons release, weapon flight profiles, or other weapon and release programming information may be pre-programmed using specialized mission planning software and subsequently downloaded to the aircraft.

In addition, conventional systems are readied by electronic testing of the circuits. However, actuation and exercising of the pistons or other release mechanisms is avoided for safety and practical reasons. For example, without a load on the pistons, actuation and testing may damage the unit and may present a danger to ground personnel due to the pyrotechnics and forces generated on the equipment. But with the solenoid release mechanism disclosed herein, a full system test at a very low energy level may allow the testing of all system components in the firing chain at a reduced energy state. Such a capability would provide increased readiness conformation and preflight testing capabilities not previously available in conventional systems. In other examples, the system may also record the current waveforms using the Hall Effect (e.g., measuring the voltage difference across an electrical conductor that is transverse to an electric current in the conductor and to an applied magnetic field perpendicular to the current) or via other sensors and to maintain a log of such data for multiple firings that would allow predictive maintenance on the system.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, subcombinations, and permutations of structure, operations, and/or other features described herein and in the accompanying drawing figures.

Although examples are described above, features and/or steps of those examples may be combined, divided, omitted, rearranged, revised, and/or augmented in any desired manner. Various alterations, modifications, and improvements will, in view of the foregoing disclosure, readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. An ordnance ejector comprising:
    a housing;
    a plurality of sway brace assemblies extending laterally from the housing and configurable to contact ordnance suspended from the housing;
    an ejector foot movably coupled to the housing and configured to extend from the housing and push the ordnance away from the housing after release, wherein the ejector foot is configured to extend independent of the plurality of sway brace assemblies;
    one or more ordnance suspension hooks movably coupled to the housing and configured to release in conjunction with an extension of the ejector foot;
    one or more solenoids coupled to the ejector foot and energizable to cause the extension of the ejector foot, wherein the one or more solenoids are positioned within the housing; and
    a controller positioned within the housing and configured to cause, based on receiving a command associated with ordnance release, an energizing of the one or more solenoids.

2. The ordnance ejector of claim 1, further comprising an electrical energy storage device coupled to the housing, wherein the electrical energy storage device comprises one or more capacitors.

3. The ordnance ejector of claim 2, further comprising an interface coupled to the housing and configured to provide commands associated with ordnance release.

4. The ordnance ejector of claim 3, further comprising a power conversion circuitry, wherein the interface is configured for electrical connection to an aircraft electrical power system, wherein the power conversion circuitry is connected to the interface and the energy storage device.

5. The ordnance ejector of claim 4, wherein the controller is further configured to control the power conversion circuitry to charge the energy storage device.

6. The ordnance ejector of claim 2, further comprising one or more power control transistors configured to connect the energy storage device and the one or more solenoids, wherein the controller is further configured to cause the energy storage device to energize the one or more solenoids by controlling the one or more power control transistors.

7. The ordnance ejector of claim 1, wherein the one or more solenoids comprises multiple solenoids.

8. The ordnance ejector of claim 1, wherein the housing comprises an outer shape corresponding to an outer shape of, and is configured for installation in an aircraft that accepts, one of: a BRU-32 Series Ejector Unit Rack Assembly, a BRU-33 Series Vertical Ejector Unit Rack Assembly, a BRU-55 Series Aircraft Bomb Ejector Unit Rack, a BRU-75/A or BRU-76/A Bomb Rack Unit, a BRU-41/A Improved Multiple Ejector Rack Unit, a BRU-42/A Improved Triple Ejector Rack Unit, or a BRU-59 bomb ejector rack.

9. The ordnance ejector of claim 1, further configured to carry and release 200-pound to 4200-pound class munitions.

10. The ordnance ejector of claim 1, further comprising at least one additional ejector foot movably coupled to the housing and configured to extend from the housing.

11. An electrically-powered aircraft stores ejector comprising:
    a housing;
    a plurality of sway brace assemblies extending laterally from the housing and configurable to contact a store suspended from the housing;
    at least one ejector foot movably engaged with the housing and configured to push the store away from the housing after release, wherein the ejector foot is configured to extend independent of the plurality of sway brace assemblies;
    at least one solenoid positioned within the housing and coupled to the at least one ejector foot and energizable to cause extension of the ejector foot to eject the store; and
    a control circuitry positioned within the housing and configured to control release of the store.

12. The electrically-powered aircraft stores ejector of claim 11, further comprising at least one capacitor coupled to the housing.

13. The electrically-powered aircraft stores ejector of claim 12, further comprising a power conversion circuitry, wherein the power conversion circuitry is connected to the at least one capacitor.

14. The electrically-powered aircraft stores ejector of claim 13, wherein the control circuitry is further configured to control the power conversion circuitry to charge the at least one capacitor.

15. The electrically-powered aircraft stores ejector of claim 12, wherein the at least one capacitor has an electrical capacitance of about 14 F to about 42 F.

16. The electrically-powered aircraft stores ejector of claim 11, wherein the at least one solenoid has a length of travel of at least 4.5 inches.

17. The electrically-powered aircraft stores ejector of claim 11, wherein the at least one solenoid generates a mechanical force of about 3000 lbs to about 6000 lbs.

18. The electrically-powered aircraft stores ejector of claim 11, wherein the at least one solenoid is further configured to actuate a suspension hook.

19. The electrically-powered aircraft stores ejector of claim 11, further comprising a plurality of solenoids.

20. A system comprising:
    an aircraft comprising one or more hardpoints;
    a stores ejector configured to releasably engage the one or more hardpoints; and an interface in communication with the aircraft and the stores ejector, wherein the stores ejector further comprises:

a housing, an ejector foot movably coupled to the housing and configured to extend from the housing, one or more solenoids coupled to the ejector foot and energizable to cause the extension of the ejector foot, a controller circuitry, and an electrical energy storage device coupled to the controller circuitry and the one or more solenoids, wherein the electrical energy storage device is configured to discharge upon extension of landing gear of the aircraft or on command by a pilot of the aircraft.

21. The system of claim 20, further comprising a plurality of sway brace assemblies extending laterally from the housing and configurable to contact a store suspended from the housing, wherein the ejector foot is configured to push the store away from the housing after release, and wherein the ejector foot is configured to extend independent of the plurality of sway brace assemblies.

22. The system of claim 20, wherein the one or more solenoids, the controller circuitry, and the electrical energy storage device are positioned within the housing.

23. The system of claim 20, wherein the one or more solenoids are further configured to actuate a suspension hook.

* * * * *